Figure 5:
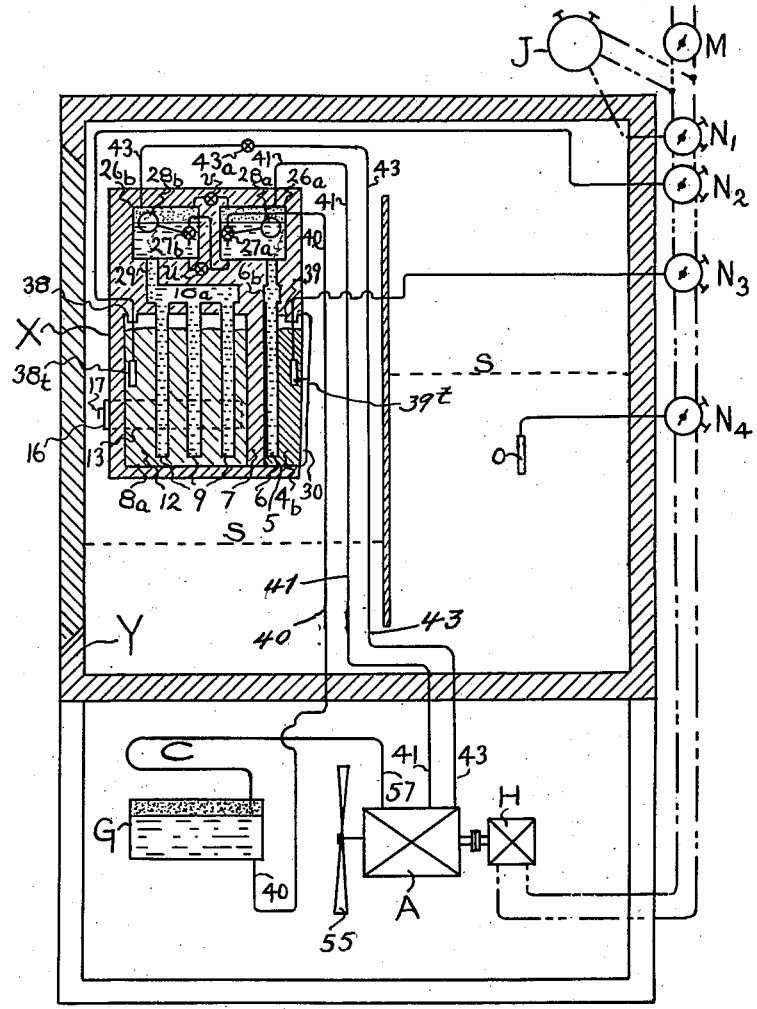

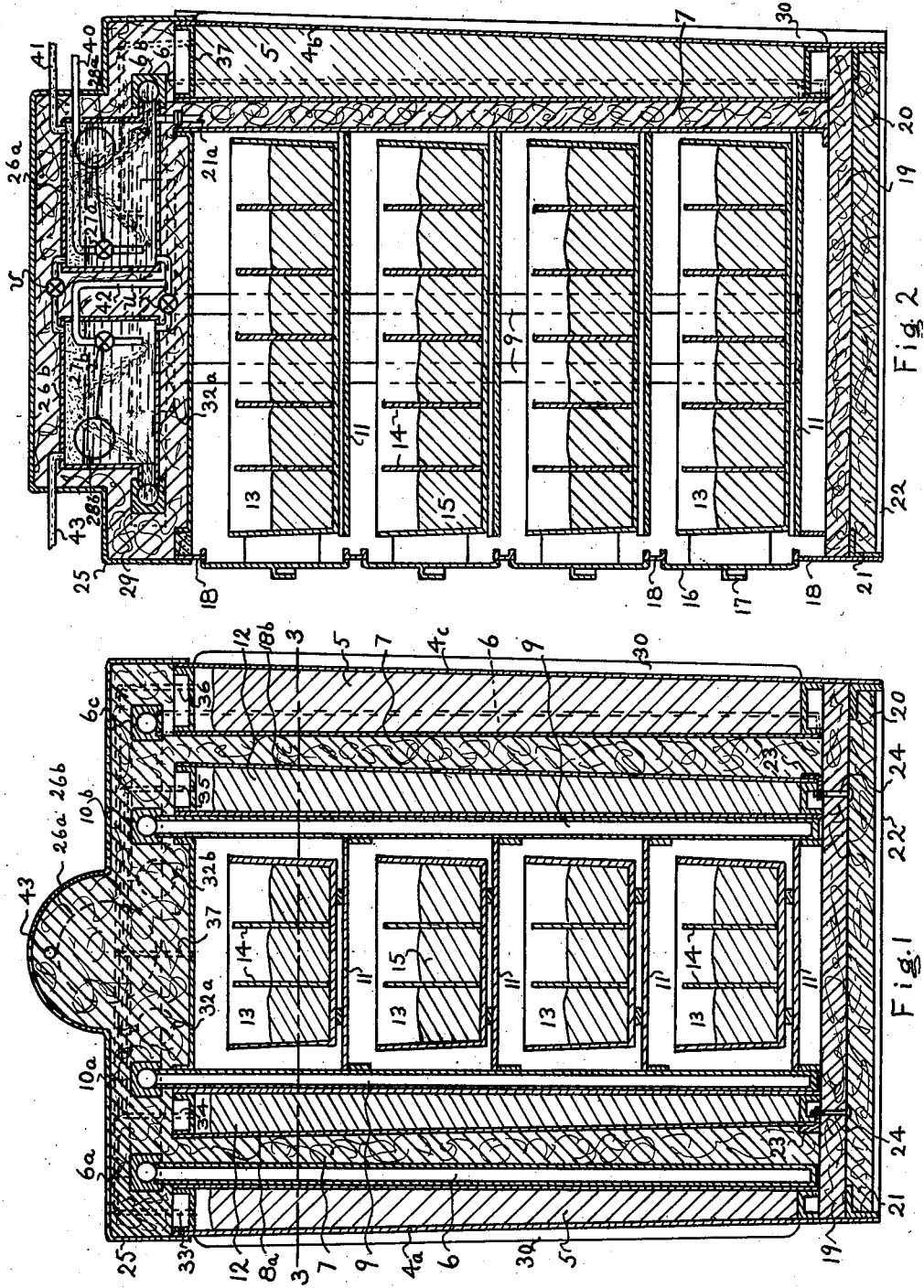

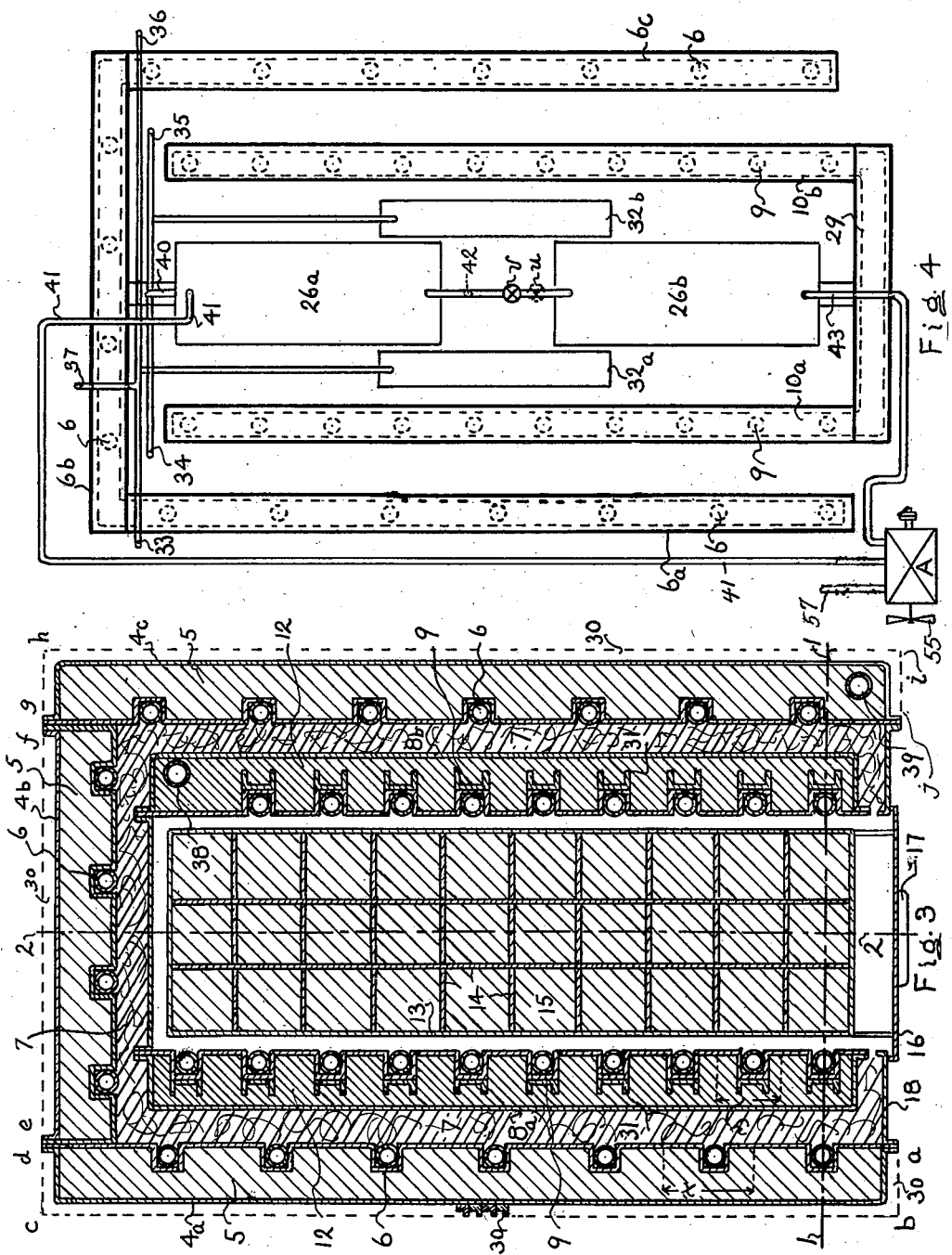

Patented Apr. 23, 1935

1,998,693

UNITED STATES PATENT OFFICE 1,998,693

THERMAL PROCESS AND APPARATUS

Gardner T. Voorhees, Boston, Mass.

Application May 2, 1927, Serial No. 188,374

12 Claims. (Cl. 62—178)

My invention relates to many thermal processes and apparatus therefor and to household refrigerating machines and may relate to any cooling process or parts or modifications thereof.

Its objects are to make such systems more desirable, economical or both.

When applied to a refrigerating system it produces a great reserve of refrigerating capacity in a small space, enables ice to stay frozen or to freeze in a warm refrigerator, or while the refrigerating machine is not in operation and permits the refrigerating machine to be shut down for long periods, such as during the night, and so avoid objectionable noise and prevents the formation of frost in the refrigerator and has many other advantages.

In the drawings which are partly diagrammatic and schematic, Figs. 1, 2 and 3 are sections through a cooling element, which may be used in a household refrigerator. Fig. 1 is a vertical section on line 1—1 of Fig. 3. Fig. 2 is a vertical section on line 2—2 of Fig. 3. Fig. 3 is a horizontal section through line 3—3 of Fig. 1. Fig. 4 is chiefly a top plan view of headers, tanks, etc., of Figs. 1, 2 and 3.

Fig. 5 shows at X, in a refrigerator Y, the cooling element of Figs. 1, 2 and 3 and also shows automatic features therefor.

In Figs. 1, 2 and 3, $4_a$, $4_b$, $4_c$ are chambers containing a high temperature latent heat of fusion substance, 5, and having tubes 6, soldered into upright notches on the inner faces of these chambers, depending from headers $6_a$, $6_b$, $6_c$. Said tubes are closed at their lower ends and open at their upper ends, opening into a channel in said headers. 7 is insulation between the inner faces of the high temperature latent heat of fusion chambers $4_a$, $4_c$ and the outer faces of low temperature latent heat of fusion chambers $8_a$, $8_b$, said latter chambers being similar to chambers $4_a$, $4_b$, $4_c$ and having tubes 9, closed at their lower ends and depending from headers $10_a$, $10_b$, having a channel therein communicating with the open upper ends of tubes 9. 11 are heat conducting shelves contacting with the inner faces of chambers $8_a$, $8_b$, wherein the low temperature latent heat of fusion substance 12, is located. 13 are heat conducting pans, provided with divisions 14, adapted to contain water to be frozen into ice cubes 15.

Pans 13 have fronts 16 and handles 17, forming drawers, removable from shelves 11. 18 is a front through which the drawers are inserted.

The latent heat of fusion chambers are supported by insulation 19, 20 and angle irons 21 and bottom 22.

The inner chambers have angle irons 23 and bolts 24.

25 is a cover. $26_a$, $26_b$ are tanks; tank $26_b$ may, via opened valved connections $u$ and $v$, act as an extension of tank $26^a$, or may, via closed valved connections $u$ and $v$, act as a low pressure tank when tank $26_a$ acts as a high pressure tank. Tank $26_a$ has float valve $27_a$ actuated by float $28_a$.

Tank $26_b$ has float valve $27_b$ actuated by float $28_b$. Header $6_b$, connects with headers $6_a$ and $6_c$ opening into tank $26_a$ and header 29 connects with headers $10_a$, $10_b$, opening into tank $27_b$.

The latent heat of fusion chambers, as shown, are made of sheet metal with riveted and soldered joints and the bottom front and top are made of sheet metal, all riveted and soldered or screwed together. 30 are fins, soldered to the outer faces of the high temperature chambers, and extending over the outer portion of said faces, as, in Fig. 3, at $a$, $b$, $c$, $d$, $e$, $f$, $g$, $h$, $i$, $j$. 31 are heat conducting fins for tubes 9.

The construction here described may be greatly varied without departing from the basic principles of this invention.

$32_a$, $32_b$ are air tanks connected by tubes 33, 34, 35, 36, 37 to latent heat of fusion chambers.

38 and 39 are means adapted to allow for the insertion of thermostat bulbs, either directly into the latent heat of fusion substance or into a tube having a closed lower end depending thereinto.

In its simplest operation a refrigerant fluid flows via pipe 40 past float valve $27_a$ into tanks $26_a$ and $26_b$ and out therefrom and via the headers into the tubes depending therefrom, wherein it is vaporized, and its vapor flows back through the same headers into tanks $26_a$ and $26_b$ and out of pipe 41, valve $43_a$ being shut and valves $u$, $v$ being open. Vaporization of the refrigerant fluid causes the high temperature latent heat of fusion substance, 5, such as water, in the outer chambers, to be frozen at 32° F., and causes the low temperature latent heat of fusion substance, 12, such as brine, in the inner chambers, to be frozen, at say 18°. Ice cubes 15 are frozen by conduction either to tubes 9 or to low temperature latent heat of fusion substance 12, or, are prevented from melting by the latent heat of fusion substance 12. Air in a refrigerator is cooled by the latent heat of fusion substance 5, via fins 30.

I proportion the tube spacing, as shown at $x$ and $y$ of Fig. 3, so that I get any desired rate of freezing of the high and low temperature latent heat of fusion substances, preferably so that they each freeze in about the same length of time. Here the thickness of $x$ frozen, is more than the thickness of $y$ frozen, before freezing together between adjacent tubes.

When operating with two different suction pressures, with valves $u$ and $v$ closed, tank $26_a$ becomes a high pressure tank or multiple effect receiver and tank $26_b$ becomes a low pressure tank, so that cold liquid from tank $26_a$ flows via pipe 42 to float valve $27_b$, and, 43 is the low suction outlet and 41 is the high suction outlet, pipes 41 and 43 leading to high and low pressure suction apparatus, such for example, as individual compressors, or a compound compressor, or a multiple effect compressor, or a multiple effect compressor device, or, to any desired suction means adapted for high and low suction pressures.

When I use high and low suction pressures I preferably make different relative spacings of the depending tubes in the high and low temperature latent heat of fushion chambers, than I do when only one suction pressure is used.

I also make the freezing points of the latent heat of fusion substances such as to be best adapted for their desired heat loads.

Thermostats at 38 and 39 are usually adapted to start up a compressor when a latent heat of fusion substance is all or partially melted and to stop said compressor when both of the latent heat of fusion substances are nearly or wholly frozen.

It is seen that the location of tubes 9 is such that the liquid refrigerant works directly in freezing ice cubes 15 and freezing low temperature latent heat of fusion substance 12, so that I may utilize the low temperature of the liquid refrigerant for freezing the ice cubes, or, may use a temperature only slightly above it, from the thawing low temperature latent heat of fusion substance, 12, for a like purpose.

I do not limit myself to any specific latent heat of fusion substance nor to any specific freezing point thereof.

In Fig. 5, K is the cooling unit of Figs. 1, 2, 3, in a refrigerator Y. A is a compressor, H any desired source of power or heat, such for example as an electric motor, when H is a source of heat A becomes an absorption machine. J is a clock, M is a main switch, $N_1$, $N_2$, $N_3$, $N_4$ are automatic switches, $38_t$, $39_t$, O are thermostats.

In Fig. 5, where A is a compressor of any desired type and H is an electric motor, then motor H actuates compressor A and liquid refrigerant, via pipe 40, from tank G flows to and is vaporized in K as was described in connection with Figs. 1, 2, 3 and the vapor therefrom flows into compressor A and is discharged therefrom, via pipe 57, into condenser C, wherein it is liquefied and returned to tank G. Clock J actuates switch $N_1$ so that motor H can or cannot operate, as may be desired, provided thermostats $38_t$, $39_t$ close or open their switches.

These thermostats are adapted, because of a volatile liquid in their bulbs, to start the compressor at pre-determined high temperatures and their corresponding pressures and to stop the compressor at pre-determined low temperatures and their corresponding pressures.

Clock J is adapted not to allow motor H to start compressor A during any desired time interval, as say from some time in the evening, to some time in the morning, when the noise from the compressor might be objectionable, or during such a period as would best suit the load period of a public service corporation, furnishing electricity for the operation of said motor.

S are shelves, usually of open work metal.

With $N_1$ circuit open, neither $N_2$ nor $N_3$ nor O can start the motor, while, with $N_1$ circuit closed, either $N_2$ or $N_3$ or $N_4$ or O can have their circuits closed or opened and so start or stop the motor H.

In Figs. 1, 2 and 3, sufficient room is left at the top of latent heat of fusion chambers for the expansion of the latent heat of fusion substance, due to freezing.

This space may be evacuated or may vent air thus compressed into chambers $32_a$, $32_b$, and this compressed air may be used to actuate a thermostat, for a latent heat of fusion chamber, in place of $38_t$ or $39_t$. The outer faces of the latent heat of fusion chambers are tapered so as to prevent the entrapping of unfrozen liquid, because said chambers are thus wider at a higher level than at a lower level.

I claim:

1. In a refrigerating process the method of freezing a low temperature latent heat of fusion substance by conducting heat therefrom to a low pressure circulating refrigerant fluid, to vaporize it, and freezing a high temperature latent heat of fusion substance by conducting heat therefrom to a high pressure circulating refrigerant fluid, to vaporize it and cooling air by conducting heat from said air to melt a portion of said high temperature substance and freeezing water by conducting heat therefrom to melt a portion of said low temperature substance.

2. In a refrigerating process the method of freezing a low temperature latent heat of fusion substance and a high temperature latent heat of fusion substance by conducting heat therefrom to a circulating refrigerant fluid and cooling air by conducting heat therefrom to melt a portion of said high temperature substance and freezing water by conducting heat therefrom to melt a portion of said low temperature substance and automatically stopping the refrigerating effect of said refrigerant when both of the substances have been all or partly frozen and automatically starting the refrigerating effect of said refrigerant when either substance has been all or partly melted, the low temperature substance being frozen by the conduction of heat therefrom to a low pressure portion of the refrigerant and the high temperature substance being frozen by the conduction of heat therefrom to a high pressure portion of the refrigerant.

3. In a refrigerating process the method of freezing a low tempreature and a high temperature latent heat of fusion substance by conducting heat therefrom to a circulating refrigerant fluid, to vaporize it, and cooling air by conducting heat therefrom to melt a portion of said high temperature substance and freezing water by conducting heat therefrom to melt a portion of said low temperature substance and automatically stopping the refrigerating effect of said refrigerant when the two substances have been all or partly frozen and automatically starting the refrigerating effect of said refrigerant when either of the two substances has been all or partly melted, the low temperature substance being frozen by the conduction of heat therefrom to a low pressure portion of the refrigerant and the high temperature substance being frozen by the conduction of heat therefrom to a high pressure portion of the refrigerant.

4. A cooling and freezing element adapted to cool air in a refrigerator and to freeze water, consisting of a chamber adapted to contain a high temperature latent heat of fusion substance and a chamber adapted to contain a low temperature latent heat of fusion substance and chambers adapted for the circulation of a refrigerant fluid therein, the low and high temperature chambers being in heat conducting contact with the refrigerant chambers and the low temperature chamber and its refrigerant chamber being in heat conducting contact with water to be frozen and the high temperature chamber being in heat conducting contact with the air to be cooled.

5. A cooling and freezing element adapted to cool air in a refrigerator and to freeze water into ice consisting of a chamber adapted to contain a high and a chamber adapted to contain a low temperature latent heat of fusion substance and a chamber adapted for the circulation of a refrigerant fluid therein and thermostats, the low temperature chamber being in heat conducting contact with the refrigerant chamber and with the water to be frozen and being insulated from the high temperature chamber, the high temperature chamber being in heat conducting contact with the air to be cooled, the thermostats being adapted to start and stop the circulation of the refrigerant in the refrigerant chamber within a desired temperature range in either of the latent heat of fusion chambers.

6. In a household refrigerating system the combination of a compressor, condenser and a motor with a latent heat of fusion air cooling and ice making element in a refrigerator, said element having a high temperature and a low temperature latent heat of fusion chamber, said chambers having refrigerant chambers and thermostats therein, said latent heat of fusion chambers being insulated from each other, said high temperature chamber being adapted to cool air and said low temperature chamber and its refrigerant chamber being adapted to freeze water and to maintain it frozen, means to cause the motor to actuate the compressor, a discharge conduit leading from the compressor to the condenser a liquid conduit leading from the condenser to the refrigerant chamber, with a pressure reducing means therein, a suction conduit leading from the refrigerant chamber to the compressor, means to cause a thermostat to stop the motor when both latent heat of fusion substances are all or partly frozen and to start the motor when either substance is all or partly melted, means to automatically control the flow of liquid past the pressure reducing means, from the condenser to the refrigerant chamber.

7. The combination, with a high pressure and a low pressure chamber, of a high pressure float governed expansion valve and a low pressure float governed expansion valve with a liquid conduit leading to the high pressure valve and a liquid conduit leading from under the high pressure liquid's level, in the high pressure chamber, to the low pressure valve and a high pressure suction conduit leading from the high pressure chamber and a low pressure suction conduit leading from the low pressure chamber.

8. The combination of a latent heat of fusion chamber in a refrigerator and means to alternately freeze and thaw a latent heat of fusion substance in said chamber, so disposed therein that its melted portion will cause said chamber to cool air in a refrigerator, means to prevent said melted portion from freezing to that portion of said chamber which cools said air, to prevent a continued accumulation of frost on that portion of said chamber, contacting with and cooling said air.

9. A cooling and freezing element adapted to cool air in a refrigerator and to freeze water, consisting of a chamber adapted to contain a high temperature latent heat of fusion substance and a chamber adapted to contain a low temperature latent heat of fusion substance and chambers adapted for the circulation of a refrigerant fluid therein, the low and high temperature chambers being in heat conducting contact with the refrigerant chambers and the low temperature chamber and its refrigerant chamber being in heat conducting contact with water to be frozen and the high temperature chamber being in heat conducting contact with the air to be cooled, the low temperature chamber being insulated from the high temperature chamber.

10. The combination with a condenser and a multiple effect compressor of a combined cooling and freezing element consisting of two latent heat of fusion chambers, one thereof containing a low temperature latent heat of fusion substance and the other thereof containing a high temperature latent heat of fusion substance, a low temperature refrigerator contacting with the low temperature substance and a high temperature refrigerator contacting with the high temperature substance, suction conduits leading from the refrigerators to the multiple effect compressor and a discharge conduit leading from the multiple effect compressor to the condenser and liquid conduits, with throttling means therein, leading from the condenser to the refrigerators, the low and high temperature latent heat of fusion chambers being so adjacently and relatively located that refrigeration losses of the low temperature chamber will help to cool the high temperature chamber.

11. The combination with a condenser and a multiple effect compressor of a combined cooling and freezing element consisting of two latent heat of fusion chambers, one thereof containing a low temperature latent heat of fusion substance and the other thereof containing a high temperature latent heat of fusion substance, a low temperature refrigerator contacting with the low temperature substance and a high temperature refrigerator contacting with the high temperature substance, suction conduits leading from the refrigerators to the multiple effect compressor and a discharge conduit leading from the multiple effect compressor to the condenser and liquid conduits, with throttling means therein, leading from the condenser to the refrigerators, the high temperature chamber being adapted to cool air and the low temperature chamber being adapted to freeze water, the latent heat of fusion chambers being so adjacently and relatively located that refrigeration losses of the low temperature chamber will help to cool the high temperature chamber.

12. In a freezing process, adapted to freeze a body of liquid in a desired length of time, to a plurality of adjacent freezing surfaces, the method of so spacing the surfaces, one from the other, such a distance apart, as will, with a given temperature of freezing surfaces, cause the liquid between them to freeze towards each other and to then freeze together in the desired length of time.

GARDNER T. VOORHEES.